United States Patent
Guo et al.

(10) Patent No.: US 7,788,412 B2
(45) Date of Patent: Aug. 31, 2010

(54) DISPLAY SYSTEM AND METHOD

(75) Inventors: Zihua Guo, Beijing (CN); Xiaoping Yan, Beijing (CN); Wei Wei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 117 days.

(21) Appl. No.: 12/086,166

(22) PCT Filed: Dec. 14, 2006

(86) PCT No.: PCT/CN2006/003416

§ 371 (c)(1),
(2), (4) Date: Jun. 6, 2008

(87) PCT Pub. No.: WO2007/068211

PCT Pub. Date: Jun. 21, 2007

(65) Prior Publication Data

US 2009/0141186 A1 Jun. 4, 2009

(30) Foreign Application Priority Data

Dec. 14, 2005 (CN) .......................... 2005 1 0130572
Sep. 29, 2006 (CN) .......................... 2006 1 0140642

(51) Int. Cl.
*G06F 3/00* (2006.01)
*H04N 5/66* (2006.01)

(52) U.S. Cl. ................................ 710/1; 710/62; 710/52; 725/112; 725/118; 725/143

(58) Field of Classification Search ...................... 710/1, 710/52, 62–68, 78; 725/143–148, 112–113; 725/118; 375/146–147
See application file for complete search history.

(56) References Cited

U.S. PATENT DOCUMENTS

| 6,941,395 | B1* | 9/2005 | Galang et al. ................. 710/65 |
| 7,484,112 | B2* | 1/2009 | Noorbakhsh et al. ........ 713/340 |
| 7,518,624 | B2* | 4/2009 | Ford et al. .................. 348/383 |
| 2003/0208779 | A1* | 11/2003 | Green et al. ................. 725/143 |
| 2004/0117538 | A1* | 6/2004 | Liu ............................ 710/315 |
| 2004/0181806 | A1* | 9/2004 | Sullivan ....................... 725/73 |
| 2007/0011712 | A1* | 1/2007 | White et al. ................. 725/112 |
| 2007/0061414 | A1* | 3/2007 | Bakke ........................ 709/217 |
| 2007/0094699 | A1* | 4/2007 | Chen .......................... 725/133 |
| 2007/0260785 | A1* | 11/2007 | Chen ........................... 710/62 |

(Continued)

FOREIGN PATENT DOCUMENTS

CN 1336761 A 2/2002

(Continued)

*Primary Examiner*—Christopher B Shin

(57) ABSTRACT

A display system and method are disclosed. The system comprises a data transmitting apparatus built in a computer and a data receiving apparatus connected to a remote VGA/DVI display device, in which the data transmitting apparatus comprises a collecting unit for collecting screen data and/or audio data in video signals and a local control unit for encoding said screen data and/or audio data and transmitting said encoded screen data and/or audio data; the data receiving apparatus comprises a remote control unit for controlling the reception of said screen data and/or audio data and decoding it, a buffer unit for controlling the audio/video data decoded by the remote control unit to be placed into a memory for buffering, and an output unit for converting the buffered screen data and/or audio data into a format supported by the VGA/DVI display device and/or audio format.

17 Claims, 4 Drawing Sheets

U.S. PATENT DOCUMENTS

| | | | |
|---|---|---|---|
| 2008/0052428 A1* | 2/2008 | Liang et al. | 710/62 |
| 2008/0148307 A1* | 6/2008 | Nielsen et al. | 725/9 |
| 2008/0225771 A1* | 9/2008 | Guo et al. | 370/312 |
| 2009/0029647 A1* | 1/2009 | Wei et al. | 455/41.3 |
| 2009/0109332 A1* | 4/2009 | Lin | 348/441 |
| 2009/0174826 A1* | 7/2009 | Ford et al. | 348/839 |

FOREIGN PATENT DOCUMENTS

JP    2005204183 A    7/2005

* cited by examiner

Fig. 1
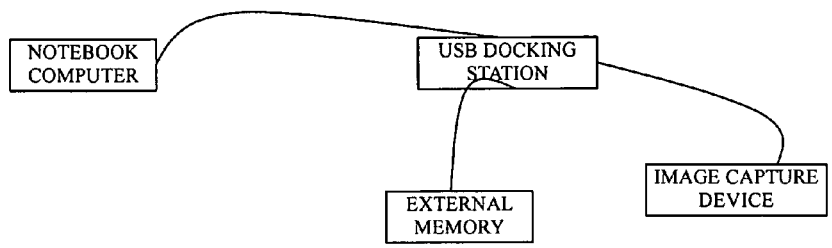
Fig. 2
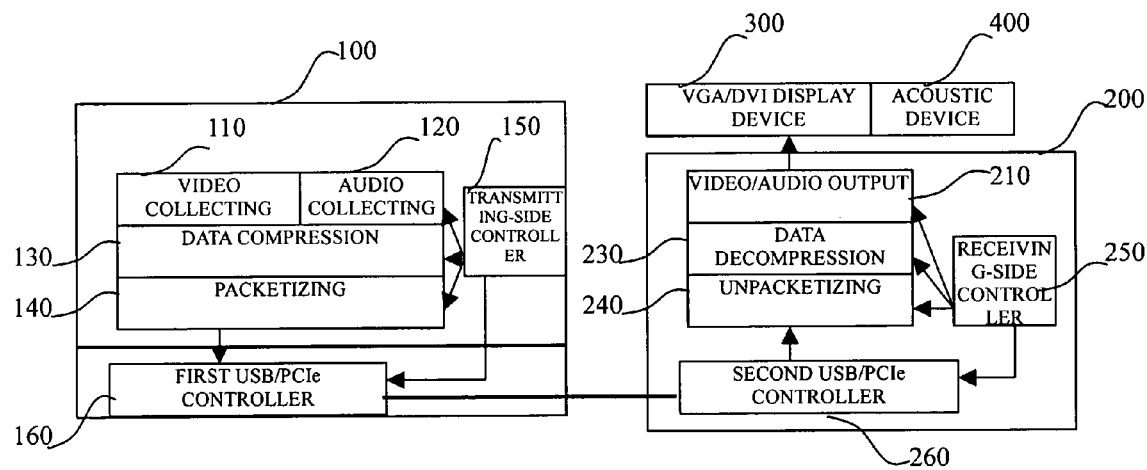
Fig. 3
| SYNCHRO FLAG | TYPE | PACKET LENGTH | PADDING LENGTH | DATA BODY | CRC |
|---|---|---|---|---|---|

DISPLAY SYSTEM AND METHOD

BACKGROUND OF THE INVENTION

1. Field of Invention

The present application relates to multi-display technology, in particular to a display system and method capable of supporting multi-display.

2. Description of Related Prior Art

With the development of various interface techniques, the notebook as a portable computer is required to support a variety of peripheral interfaces such as USB, serial and parallel port, network interface, VGA/DVI/HDMI interface and Displayport interface in the future. Accordingly, the notebook computer will become complicated and clumsy in order to support all types of these interfaces.

In view of the above issues, a concept has been proposed in the art that is based on the port replicator or docking station. That is, a peripheral device is designed as an attachment to the notebook computer and placed near the computer or under the base of the computer in a wired way, such as USB/PCIe, or in a wireless way, such as UWB. All kinds of interfaces can be integrated into the peripheral device, and thus the interface design for the notebook computer can be remarkably simplified since it needs to support only a few interfaces most commonly used. In fact, the docking station has been becoming one of the most important attachments in the field of the notebook computer.

FIG. 1 is a schematic diagram of a USB docking station. As shown in FIG. 1, one side of the USB docking station is connected to a notebook computer via a USB bus, and the other side thereof is coupled to an external storage device, such as a SD card, and an image capture device, such as a computer camera. The docking station converts data signals from the notebook computer into a data format adapted to the external storage device which stores the data. Also, the acquired image signals is obtained from the image capture device and transferred to the host via USB or UWB. Since other types of interfaces in the docking station, such as parallel port, Ethernet interface and the like, have a low data rate, it is easy to implement conversion from USB/UWB to these interfaces. Unfortunately, there has not been any mature solution for USB/PCIe or UWB to support a second display device, that is, for the conversion from USB/UWB/PCIe to VGA/DVI/Displayport, etc.

According to Patent Reference 1 (US2004117538), the video card in a host is removed, and display signals generated by OS are directly outputted to a USB interface. And, the signals are transmitted from the interface to another remote module, in which VGA signals are regenerated from the transmitted signals and outputted directly to a VGA display device.

Patent Reference 2 (US2002135584) discloses a video graphic adapter which drives a sub display device of a dual-mode display device with USB interface. In Patent Reference 2, video signals outputted from USB are directly stored in a memory area, and the stored video signals are converted into analog VGA signal output by a D/A converter.

Furthermore, video needs to be transferred wirelessly to a remote terminal for display in many situations, for example, the communication between a wireless projector and a notebook computer. In this case, the notebook computer needs to perform a real-time acquisition of screen data and deliver the data wirelessly to the projector for output. Most of schemes for wireless display are based on such wireless technology as defined in IEEE802.11, however, In this way, the high throughput required by the display device cannot be well achieved due to the bandwidth of IEEE802.11, and thus it is necessary to employ a deeply lossy compression scheme. This would result in the problem that the displayed image cannot resemble and synchronize with the original one very well, leading to the degrading of screen quality and color distortion. Meanwhile, the above scheme burdens both of the computer and the display device with a heavy computational load, and thus affects the system performance to a great extent. Moreover, cost tends to be uncontrollable, since the display side usually requires a typical embedded system including CPU/OS/DSP to retrieve the video and output. In conclusion, because of the limited bandwidth of the existing 802.11 system, screen data of high-quality cannot be transmitted timely to the display device side while the computer is playing real-time video, especially video of high-quality.

SUMMARY OF THE INVENTION

The present invention is made in consideration of the above problems, and an object of the present invention is to provide a display system and method supporting multi-display.

In one aspect of the present invention, a display system is provided comprising a data transmitting apparatus built in a computer and a data receiving apparatus connected to a remote VGA/DVI display device, in which the data transmitting apparatus comprises a collecting unit for collecting screen data and/or audio data in video signals and a local control unit for encoding said screen data and/or audio data and transmitting said encoded screen data and/or audio data; the data receiving apparatus comprises a remote control unit for controlling the reception of said screen data and/or audio data and decoding it, a buffer unit for controlling the audio/video data decoded by the remote control unit to be placed into a memory for buffering, and an output unit for converting the buffered screen data and/or audio data into a format supported by the VGA/DVI display device and/or audio format.

Preferably, the data transmitting apparatus further comprises a compression unit for compressing said screen data and/or audio data by use of a predetermined compression algorithm, and the data receiving apparatus further comprises a decompression unit for decompressing the compressed screen data and/or audio data by use of a predetermined decompression algorithm.

Preferably, the display system supports multi-session function. The data transmitting apparatus further comprises an input/output mapping unit for mapping a remote input/output operation into a local input/output operation, and the data receiving apparatus further comprises an input/output interface unit connecting a keyboard/mouse for an input/output operation by a user.

Preferably, the data receiving apparatus is realized with embedded CPU, FPGA or chip.

Preferably, the screen data and/or audio data are obtained by the operating system of the host.

Preferably, the data transmitting apparatus captures data for display by virtualizing a video card device with Mirror Driver under Windows.

Preferably, the screen data and/or audio data are transmitted via USB/PCIe interface.

Preferably, the screen data and/or audio data are transmitted in the form of UWB.

In another aspect of the present invention, a method for a display system supporting multi-display comprises steps of collecting screen data and/or audio data from a host, transmitting said screen data and/or audio data to a remote display device and/or acoustic device, converting said screen data and/or audio data into the supported VGA/DVI format and audio format and presenting the converted data by the display device and/or acoustic device.

Preferably, the method further comprises a step of compressing said screen data and/or audio data by use of a predetermined compression algorithm before the transmitting step and a step of decompressing the compressed screen data and/or audio data before the converting step.

Preferably, the method further comprises a step of transmitting a control command, and the display device and/or acoustic device receive said control command to switch between operating modes.

Preferably, the collecting step comprises obtaining the screen data and/or audio data by the operating system of the host.

Preferably, data for display is captured by virtualizing a video card device with Mirror Driver under Windows.

With the above configuration of the present invention, requirement on bandwidth is lowered since only the dynamically changing part of the screen data in the video signals or the full-screen data is first compressed and then transmitted to the display device side via USB interface or in the form of UWB. In addition, the present invention can be realized with a low-cost embedded CPU, FPGA or application-specific chip, with a reduced complexity of the system.

BRIEF DESCRIPTION OF THE DRAWINGS

The above advantages and features of the present invention will be more apparent from the following detailed description taken conjunction with the drawings in which:

FIG. 1 shows a schematic diagram of an existing USB docking station;

FIG. 2 shows a block diagram of a display system according to the first embodiment of the present invention;

FIG. 3 is a schematic diagram for explaining the format of data packet formed during data packetization of the first embodiment;

DETAILED DESCRIPTION OF THE PREFERRED EMBODIMENTS

Figure 4:
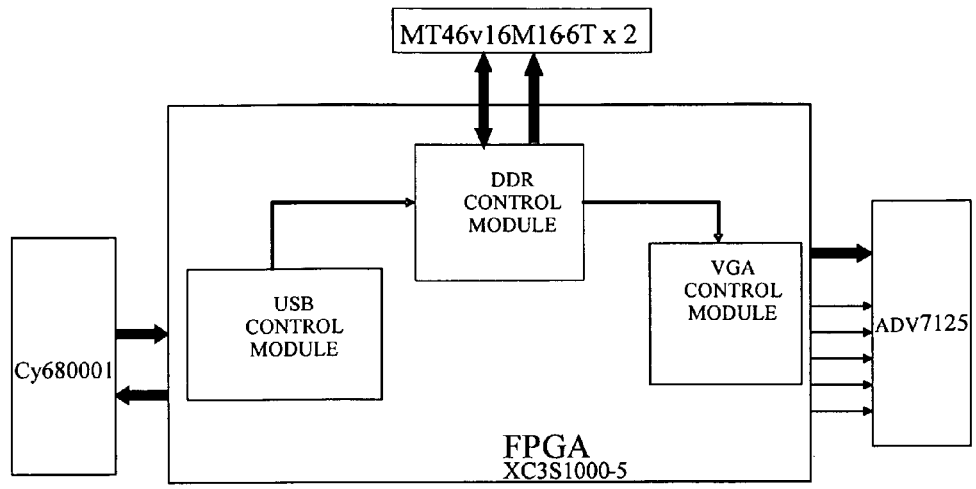
FIG. 4 shows an example of a data receiving apparatus in the display system of the first embodiment.

Hereafter, the preferred embodiments of the present invention will be elaborated with reference to the figures, throughout which the same reference signs denote the same or like components, though shown in different figures. For the purpose of clarity and conciseness, a detail account of known functions and structures incorporated here will be omitted in case that the subject of the present invention be obscured.

FIG. 2 shows a block diagram of a display system according to the first embodiment of the present invention.

As shown in FIG. 2, the display system of the first embodiment comprises a data transmitting apparatus 100 built in a host, say, a notebook computer, a VGA/DVI display device 300 and an acoustic device 400 located remotely, and a data receiving apparatus 200 connected to the display device 300 and the acoustic device 400 and for receiving multimedia data from the host side and converting the data into a format supported by a VGA/PCI display device.

The data transmitting apparatus 100 includes a video collecting unit 110 which collects dynamically changing screen data or full-screen data in current video signals, from the host like a notebook computer, a audio collecting unit 120 which collects audio signals synchronously with the current video signals or separate audio signals from the host to obtain audio data, a data compression unit 130 which compresses the screen data and the audio data collected by the video collecting unit 110 and the audio collecting unit 120 with a predetermined compression algorithm, such as MPEG or JPEG compression algorithm or proprietary algorithm, so as to output compressed data, a packetizing unit 140 which form the compressed data into data packets of a corresponding format based on a predetermined protocol, a first USB/PCIe controller 160 which transfers the data packets formed by the packetizing unit 140 via a USB/PCIe interface, and a transmitting-side controller 150 which controls the above respective units, such as control on synchronization of audio and video data, whether to compress certain data packets as well as signaling interaction, for example, mode switching and the like.

The data receiving apparatus 200 includes a second USB/PCIe controller 260 which resembles the first USB/PCIe controller 160 in the data transmitting apparatus 100 and controls the reception of data packets transmitted from the data transmitting apparatus 100 via a USB/PCIe interface, an unpacketizing unit 240 which unpacketizes the data packets received by the USB/PCIe controller 260 according to the same protocol as that adopted in packetizing so as to obtain compressed or uncompressed screen data/audio data, a receiving-side controller 250 which controls the respective units in the data receiving apparatus 200, such as control on synchronization of audio and video data, whether to compress certain data packets as well as signaling interaction, a data decompression unit 230 which, when the receiving-side controller 250 determines that the data packets received currently have been compressed, decompresses the compressed data with a predetermined data compression algorithm so as to obtain screen data and audio data, and a video/audio output unit 210 which converts the screen data into video signals of VGA format and outputs them to the VGA/DVI/DP display device 300 for display, as well as performs D/A conversion on the audio data to output to the acoustic device 400.

Besides, the data receiving apparatus 200 includes a buffering unit (not shown) which puts the decoded audio and video data into a memory for buffering. In this case, the output unit 210 converts the buffered screen data into video data of VGA/DVI/DP format to output to the VGA/DVI/DP display device 300.

When the receiving-side controller 250 determines that the data packets outputted from the unpacketizing unit 240 is uncompressed, these data packets are transferred to the buffering unit and then to video/audio output unit directly, and the screen data or audio data are converted into corresponding display signals and analog audio signals for display on the VGA/DVI display device 300 and for output from the acoustic device 400, respectively.

FIG. 3 shows the format of data packets used during data packetization by the packetizing unit in the display system of the first embodiment. As shown in FIG. 3, 'Synchro flag' is used in the initial synchronization between the data transmitting apparatus 100 and the data receiving apparatus 200 as well as resynchronization in the case of a desynchronization occurring in data transmission. 'Type' indicates whether the current data packet is a video data packet, an audio data packet or a control signaling packet, and it also denotes whether the data packet is compressed or uncompressed. 'Packet length' represents the length of the current data packet. 'Padding length' represents the length of padding information excluding valid data in the data packet. 'Data body' represents the actual message information and may contain coordinates information, etc., for video. 'CRC' is used for checking the data packet.

As described above, the receiving-side controller 250 in the data receiving apparatus 200 can determine whether the received data packet is compressed or uncompressed and a video or audio data packet on the basis of the 'Type' field therein. In the case that the data in the data packet have been compressed, the compressed data is decompressed by the data decompression unit 230 so as to obtain the corresponding screen data and/or audio data.

In addition, if the video configuration played at the host side has been changed, for example, the display mode of the host is changed from 1024×768 to 720×480, the transmitting-side controller 150 controls the packetizing unit 140 to form the configuration information of display device into a control signaling packet, which is in turn transferred to the data receiving apparatus 200 via the USB interface. The receiving-side controller 250 in the data receiving apparatus 200 reconfigures the remote display device according to the configuration information of display device in the received control signaling packet in preparation for subsequent display.

FIG. 4 shows an instance for embodying the data receiving apparatus in the display system of the first embodiment.

The conversion module in FIG. 2 can be realized with FPGA/ASIC. As an example, FIG. 4 shows a block diagram obtained when the conversion from USB to VGA is implemented in FPGA manner. As shown in FIG. 4, Cy680001 is a USB controller and connected to an FPGA-internal USB module, in which operations, such as unpacketizing and decompression of data packet, are performed. In FPGA, a DDR module is connected to an external RAM, i.e., MT46v, so as to provide storage space for the operation of the USB control module. For instance, the USB control module stores the unpacketized and decompressed screen data and audio data into the storage space provided by the RAM under the control of the DDR control module, supplies the screen data to the VGA control module to convert them into video signals of VGA format, and then supplies these signals to ADV7125 for conversion into analog signals to be displayed on the display device.

Figure 5:
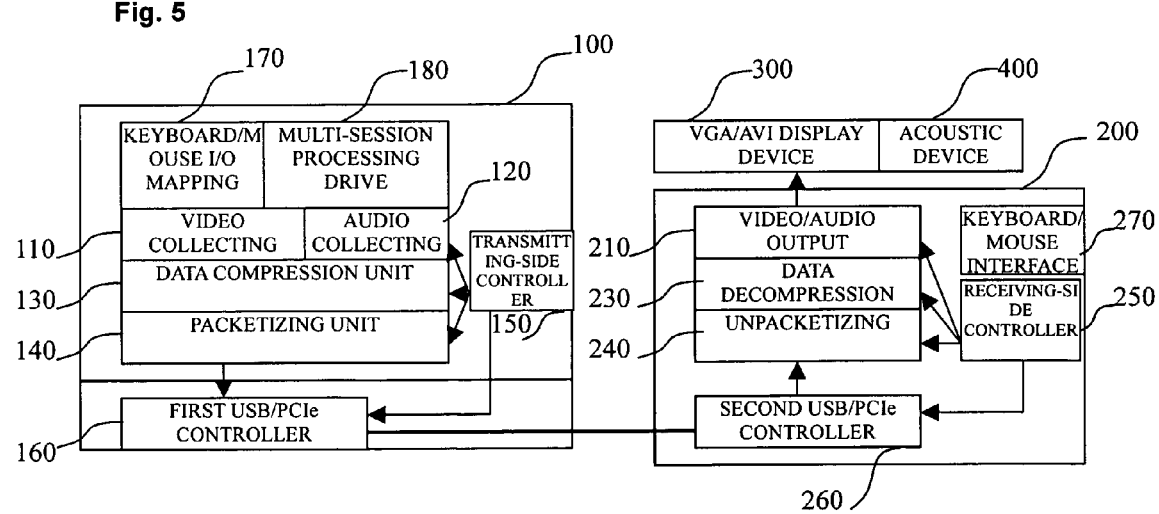
FIG. 5 shows a block diagram of the variation of the display system according to the first embodiment of the present invention.

FIG. 5 shows a block diagram of the variation of the display system according to the first embodiment of the present invention.

As shown in FIG. 5, in order to achieve a terminal supporting dual-display, the data transmitting side is required to support multi-session function and can map, for example, I/O operations of a keyboard/mouse from a remote terminal into local operations. In this way, the host will treat the display of a remote display device and keyboard/mouse operations as that of a second local user. Except a keyboard/mouse I/O mapping unit 170 and a multi-session processing drive 180, the rest of the components have the same structure as that in the data transmitting apparatus 100 of the first embodiment, and thus the detail description will be omitted.

Also, the data receiving apparatus 200 further has a keyboard/mouse interface 270 for connecting an input means 270 like a keyboard/mouse. As such, after the connection of the input means 270, a user can operate remotely, such as text processing and network browsing, in the same manner as performed locally. In this case, the receiving-side controller 250 transfers via the USB/PCIe bus various inputted commands and control information by the input means 270 to the data transmitting apparatus 100 at the host side, where these commands and information are mapped into local operations by the keyboard/mouse I/O mapping unit 170 and then sent to the multi-session processing drive 180 for processing.

As can be seen from FIG. 5, except the input means 270, the modified data transmitting apparatus 200 has the same structure as that of data transmitting apparatus 200 of the first embodiment, and thus the detailed description thereof will not be repeated. Moreover, the receiving side can be in a variety of forms, such as a docking station with a keyboard/mouse plus an external display; it can also be made in the style of a complete notebook computer without only CPU/OS/harddisk and the like, since all applications are executed at the transmitting side, while this 'dummy' notebook computer has only I/O function.

The units in the data transmitting apparatus 100 other than the first USB/PICe controller 160 can each be realized in software in the operating system of the host.

Naturally, it will be appreciated by those skilled in the art that the compression processing function may not be provided when the data transmitting apparatus at the host side is realized in the form of a data card of the host, and the description thereof will not be repeated.

Figure 6:
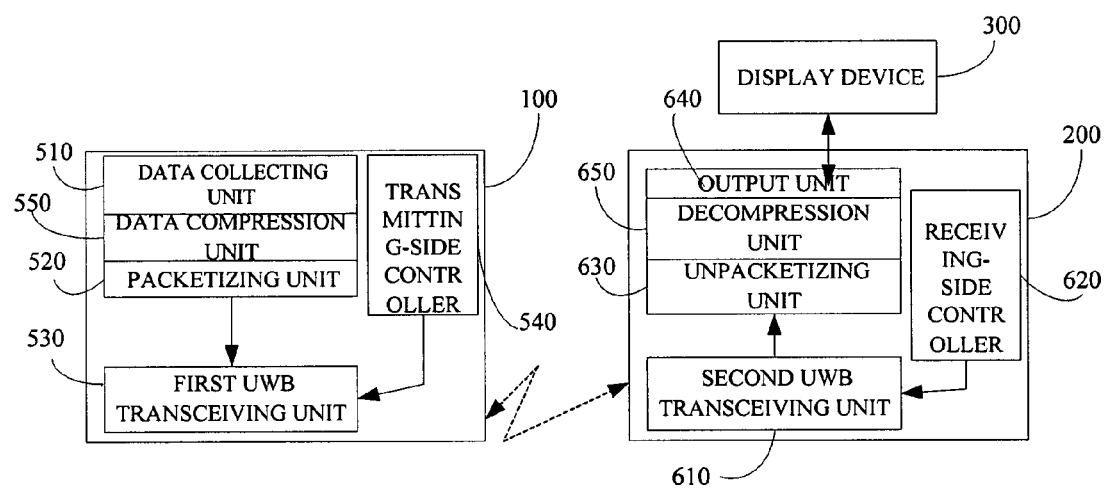
FIG. 6 is a block diagram of a display system according to the second embodiment of the present invention.

FIG. 6 is a block diagram for the second embodiment of a wireless display system according to the present invention.

As shown in FIG. 6, the data transmitting apparatus 100 built in the host comprises a data collecting unit 510, a packetizing unit 520, a first UWB (Ultra Wideband) transceiving unit 530 and a transmitting-side controller 540. The data receiving apparatus 200 connected to a display device and an acoustic device (not shown) comprises a second UWB transceiving unit 610, a receiving-side controller 620, a unpacketizing unit 630 and an output unit 640.

The host here can be all kinds of computer mainframes, such as the mainframe for a PC for a server, a notebook computer, a handheld device like a cell phone and PDA, etc.; the display device 300 can be various display devices, such as the monitor (LCD, CRT or the like) of a computer, a projector or a television.

In the data transmitting apparatus 100, the data collecting unit 510 acquires display data from the host OS. The packetizing unit 520 forms the display data obtained by the data collecting unit 510 into corresponding data message in accordance with a protocol for network transmission. The first UWB transceiving unit 530 transfers the data message to the data receiving apparatus 200 wirelessly with UWB.

In the transmitting apparatus 100, the transmitting-side controller 140 controls the first UWB transceiving unit 530 as well as performs, for example, authentication for both sides and negotiation on keys.

In the data receiving apparatus 200, the second UWB transceiving unit 610 receives wirelessly the data message from the data transmitting apparatus 100 with UWB. The receiving-side controller 620 controls the second UWB transceiving unit 610 as well as performs, for example, authentication for both sides and negotiation on keys. The unpacketizing unit 630 unpacketizes the data message received by the second UWB transceiving unit 610 into screen data in accordance with the protocol. The output unit 640 transfers the screen data to the display device 300 for outputting.

It should be noted that the present embodiment transmits digital pixel signals with UWB, and in the extreme case the frame rate of transmission is the frame rate at which the video or any content is played, that is, about 30 frames per second for video, other than transmitting at 60/75 frames per second of the refresh frequency of a video card.

On the other hand, in order to display pixel data at the receiving side in real-time manner, the data receiving apparatus 200 as another embodiment has a simple display control mechanism (i.e., the function of a video card) and can utilize the transmitted pixel data of 25 frames directly to perform high-speed refresh processing, for example, at 60/75 frames per second.

In the data transmitting apparatus 100 of the second embodiment, all the units except the first UWB transceiving unit 530 can be realized in software of the operating system on the host.

Obviously, it will be appreciated by those skilled in the art that the compression processing function may not be provided when the data traffic is not so large.

Figure 7:
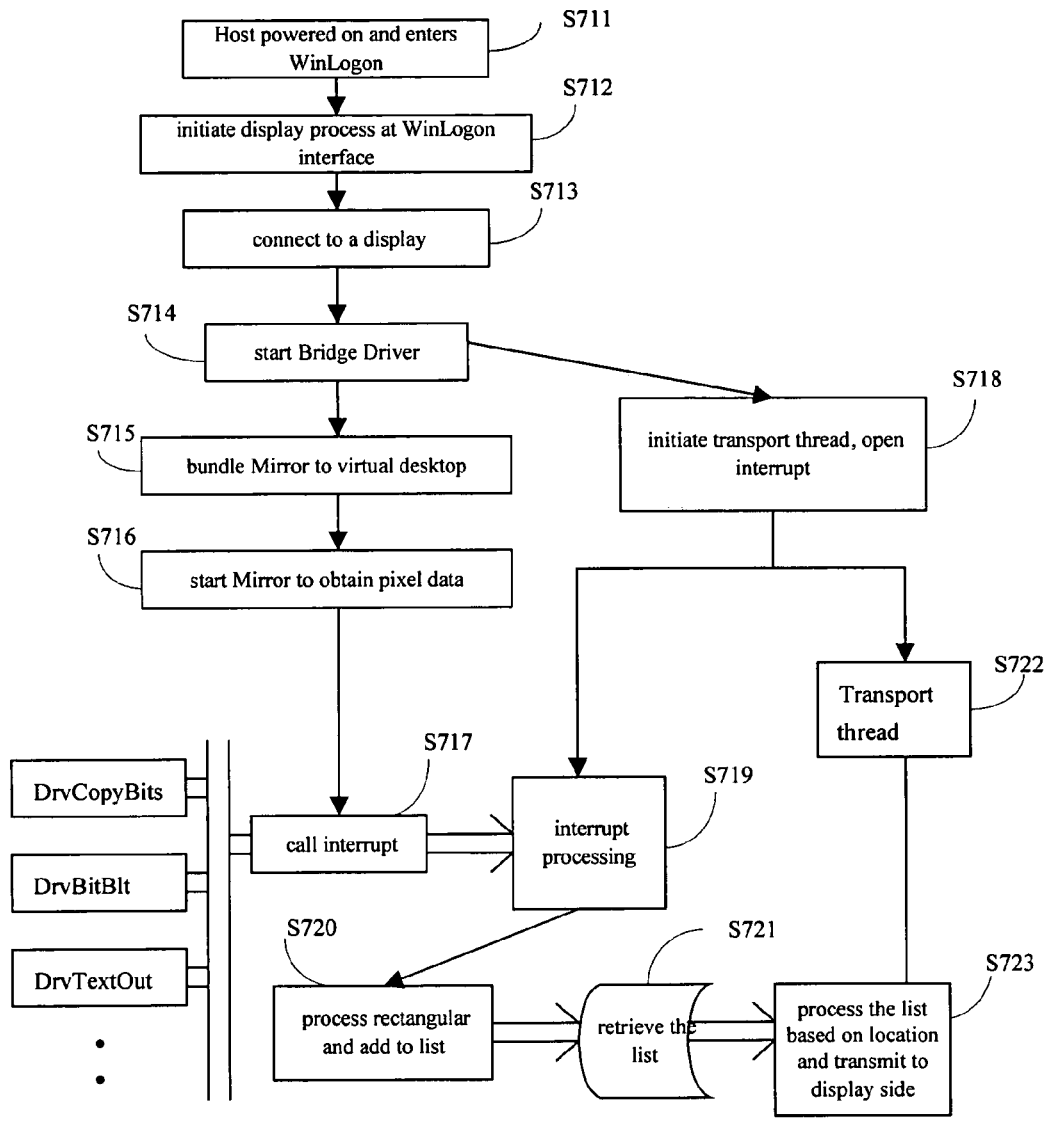
FIG. 7 is a flowchart diagram for a data transmitting apparatus of the display system according to the second embodiment of the present invention.

Now referring to FIG. 7 which is a flowchart of the operation at the host side taking as an example the processing under Windows.

At step S711, the host is powered on and enters WinLogon.

At step S712, a display process is initiated at WinLogon interface.

WinLogon provides GINA.dll, and different logon modes for Windows can be customized. The operation of initiating the display process can be completed by modifying relevant parameters in GINA.

Then, the display process carries out a series of operation as follows.

At step S713, the connection as a TCP client to a display serving as a TCP server is established.

At step S714, after a successful connection, Bridge Driver is started, which is primarily responsible for data processing and transport.

At step S715, Mirror is bundled to a virtual desktop such that the image data of the desktop can be obtained.

At step S716, Mirror is started to obtain pixel data. Here, Mirror is short for Mirror driver which, under Windows, vitualizes a video card device to capture the Windows screen. The bundling and starting of Mirror can be fulfilled by Windows GDI.

At step S717, Bridge Driver opens a soft interrupt (22H) by means of IDT (Interrupt Dispatch table), and Mirror conducts an invocation via an assemble instruction int 22H.

At step S718, a transport thread is initiated and an interrupt is opened to obtained information sent out by Mirror. The transport thread takes charge of the transport of image data.

At step S719, Bridge Driver retrieves the information on screen change in response to the interrupt sent by Mirror.

At step S720, the rectangular region of screen change is extracted based on the information provided by Mirror and added to a list.

At step S721, the list is obtained for subsequent transport processing.

At step S722, a port-reading transport thread is responsible mainly for processing related to transport, including data synchronization, message response and the like.

At step S723, according to the obtained list of rectangular regions at step S721, corresponding data is retrieved and then transferred to the display device.

The solution shown in FIG. 7 has the most impressive advantage in that wireless display can be implemented as soon as the system enters the start interface for OS (e.g., Windows login interface) rather than waiting until login is finished.

The foregoing description is intended to only illustrate the embodiments of the present invention. Those skilled in the art will understand that any modification and partial substitution made within the scope of the present invention should be encompassed by the scope of the present invention in the claims. Thus, the scope of the present invention should be defined by the appended claims.

What is claimed is:

1. A display system comprising a data transmitting apparatus built in a computer and a data receiving apparatus connected to a remote VGA/DVI display device, wherein
said data transmitting apparatus comprises:
a collecting unit for collecting screen data and/or audio data in video signals; and
a local control unit for encoding said screen data and/or audio data and transmitting encoded screen data and/or audio data;
said data receiving apparatus comprises:
a remote control unit for controlling the reception of said screen data and/or audio data and decoding;
a buffer unit for controlling the audio/video data decoded by the remote control unit to be placed into a memory for buffering; and
an output unit for converting the buffered screen data and/or audio data into a format supported by the VGA/DVI display device and/or audio format;
wherein the local control unit controls a packetizing unit to form the configuration of the display device of the computer into a control signaling packet if a video configuration played at the data transmitting apparatus changes, and the control signaling packet is transferred to the receiving apparatus; and
wherein the remote control unit reconfigures the remote display according to the configuration of the display device in the received control signaling packet in preparation for subsequent display.

2. The display system of claim 1, wherein
said data transmitting apparatus further comprises:
a compression unit for compressing said screen data and/or audio data by use of a predetermined compression algorithm; and
said data receiving apparatus further comprises:
a decompression unit for decompressing the compressed screen data and/or audio data by use of a predetermined decompression algorithm.

3. The display system of claim 1, wherein said display system supports multi-session function;
said data transmitting apparatus further comprises:
an input/output mapping unit for mapping a remote input/output operation into a local input/output operation; and
said data receiving apparatus further comprises:
an input/output interface unit for connecting a keyboard/mouse for an input/output operation by a user.

4. The display system of claim 3, wherein said data receiving apparatus is realized with an embedded CPU, FPGA or chip.

5. The display system of claim 1, wherein the screen data and/or audio data are obtained via the operating system of said computer.

6. The display system of claim 5, wherein said data transmitting apparatus captures data for display by virtualizing a video card device with a Minor Driver under Windows.

7. The display system of claim 1, wherein said screen data and/or audio data are transmitted via USB/PCIe interface.

8. The display system of claim 1, wherein said screen data and/or audio data are transmitted in the form of UWB.

9. A method used in a display system capable of supporting multi-display, comprising the steps of:
collecting screen data and/or audio data from a computer;
transmitting said screen data and/or audio data to a remote display device and/or acoustic device;

converting said screen data and/or audio data into a supported VGA/DVI format and audio format and presenting the converted data by the display device and/or acoustic device;

controlling a packetizing unit to form the configuration of a display device of the computer into a control signaling packet if a video configuration played at the computer changes, and transferring the control signaling packet to the remote display device; and reconfiguring the remote display device according to the configuration of the display device of the computer in the received control signaling packet in preparation for subsequent display.

10. The method of claim 9, further comprising:
compressing said screen data and/or audio data by use of a predetermined compression algorithm before said transmitting step, and
decompressing the compressed screen data and/or audio data before said converting step.

11. The method of claim 10, further comprising:
transmitting a control command; and
the display device and/or acoustic device receiving said control command to switch between operating modes.

12. The method of claim 9, wherein said step of collecting comprises obtaining the screen data and/or audio data via the operating system of said computer.

13. The method of claim 12, wherein data for display are captured by virtualizing a video card device with a Minor Driver under Windows.

14. The method of claim 9, wherein said screen data and/or audio data are transmitted via USB interface.

15. The method of claim 9, wherein said screen data and/or audio data are transmitted in the form of UWB.

16. The display system of claim 1, wherein the packetizing unit is arranged to packetize the data to be transmitted into a format of a data packet, and the format of the data packet comprises fields of "Synchro flag", "Type", "Packet length", "Padding length", "Data body" and "CRC", and wherein 'Synchro flag' is used in the synchronization between the data transmitting apparatus and the data receiving apparatus, 'Type' indicates whether the current data packet is a video data packet, an audio data packet or a control signaling packet, 'Packet length' indicates the length of the current data packet, 'Padding length' indicates the length of padding information in the data packet, 'Data body' indicates actual message information, and 'CRC' is used for checking the current data packet.

17. The method of claim 9, wherein the method further comprises packetizing by the packetizing unit the data to be transmitted into a format of a data packet, and the format of the data packet comprises fields of "Synchro flag", "Type", "Packet length", "Padding length", "Data body" and "CRC", and wherein 'Synchro flag' is used in the synchronization between the data transmitting apparatus and the data receiving apparatus, 'Type' indicates whether the current data packet is a video data packet, an audio data packet or a control signaling packet, 'Packet length' indicates the length of the current data packet, 'Padding length' indicates the length of padding information in the data packet, 'Data body' indicates actual message information, and 'CRC' is used for checking the current data packet.

* * * * *